United States Patent Office 3,446,498
Patented May 27, 1969

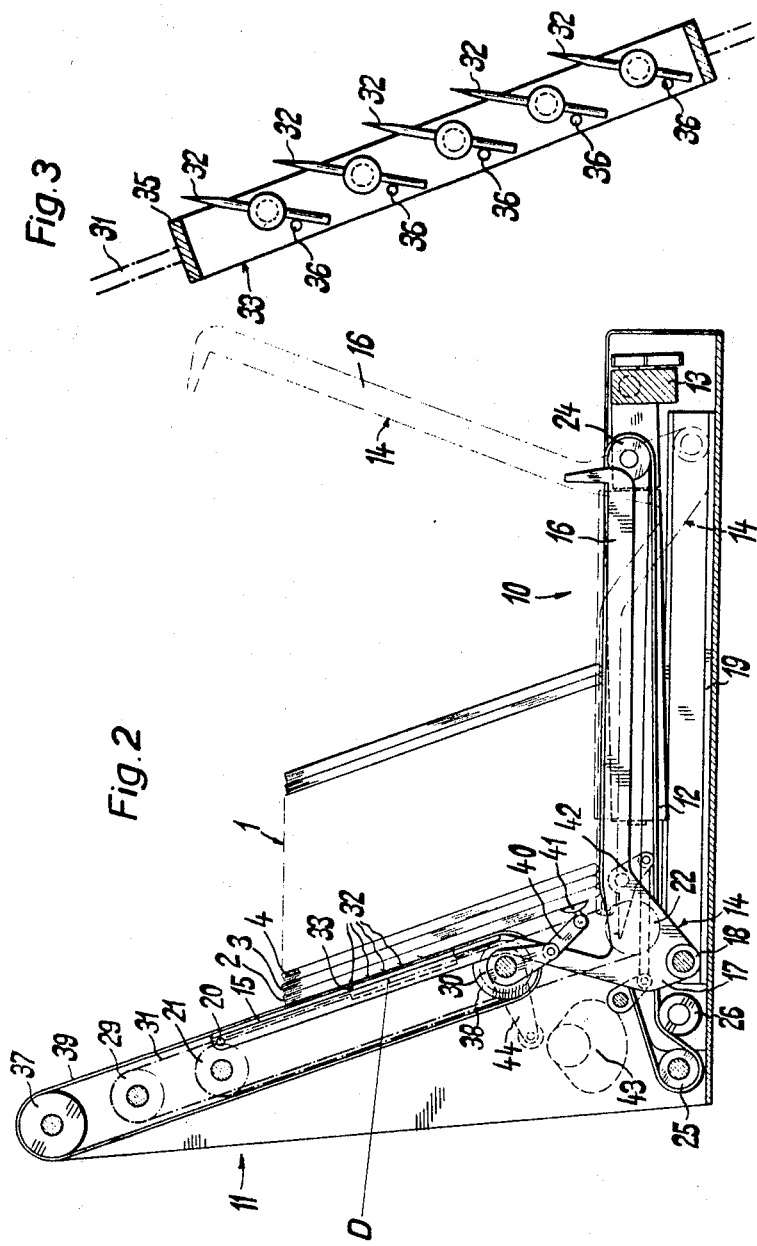

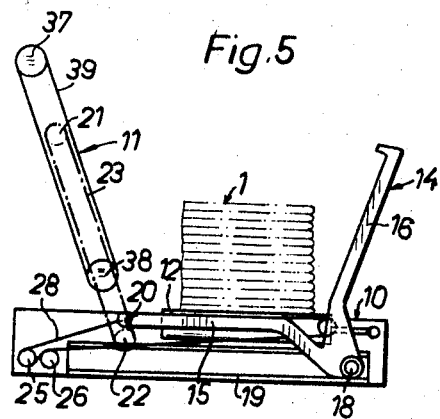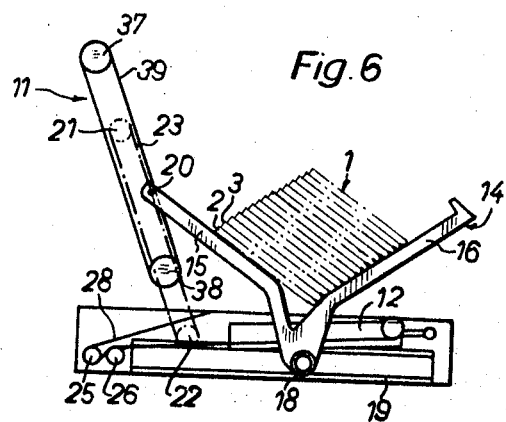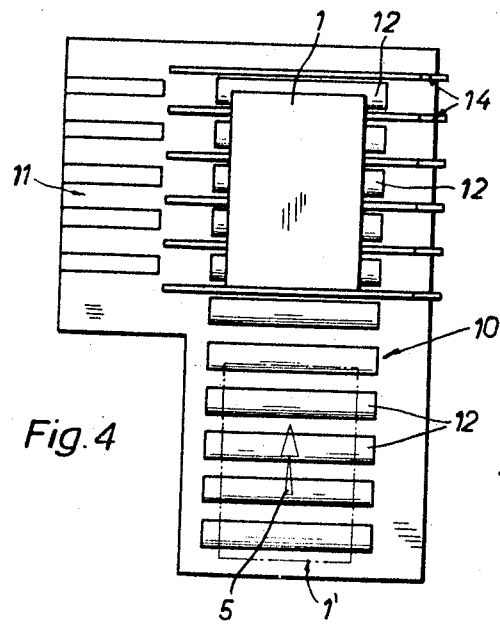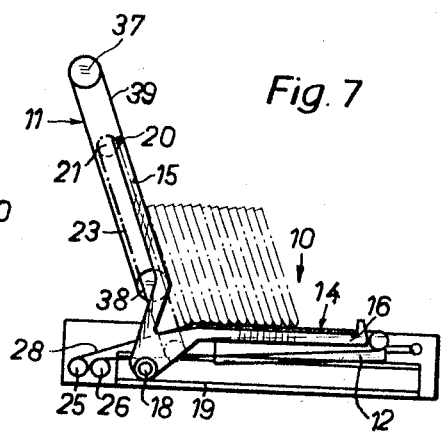

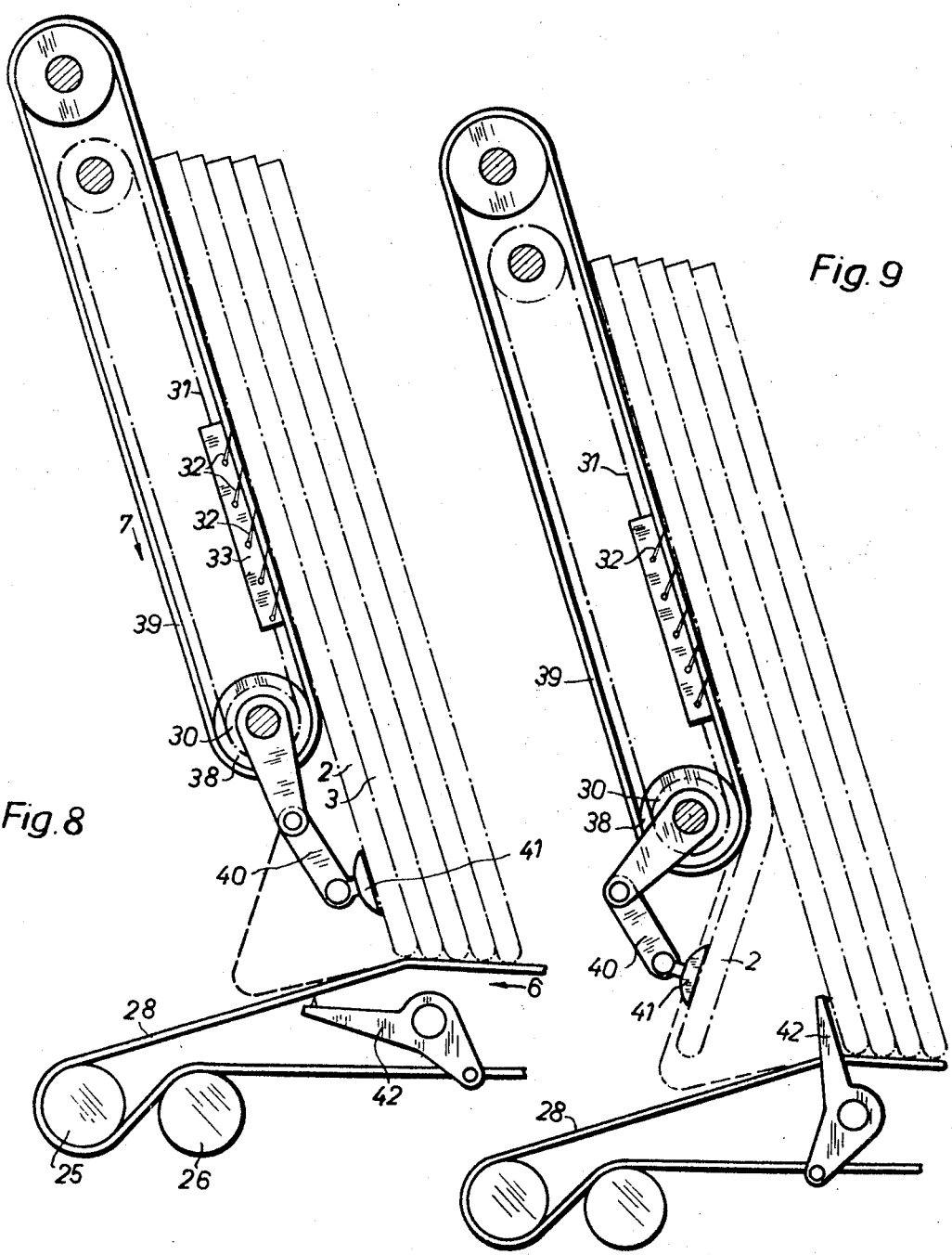

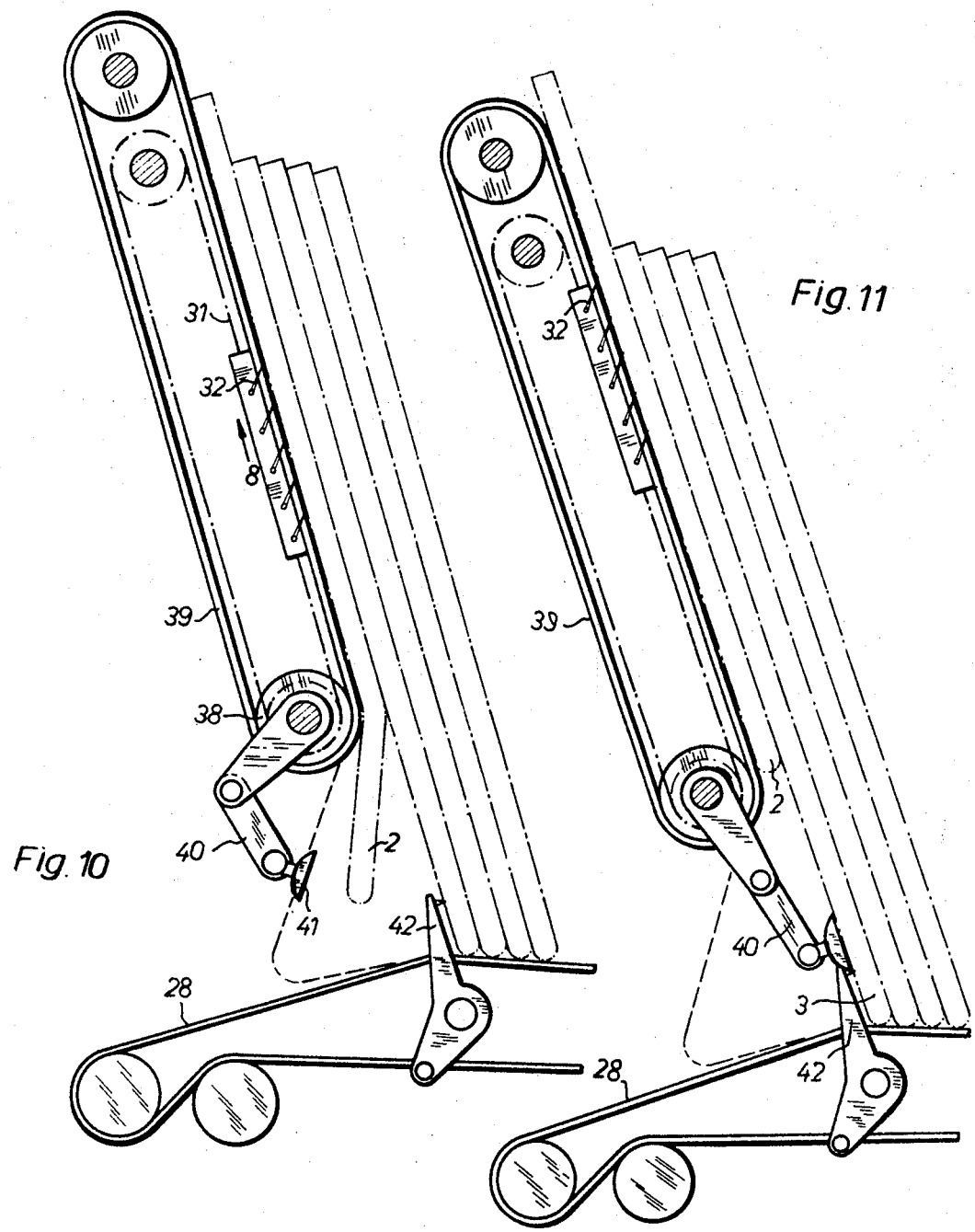

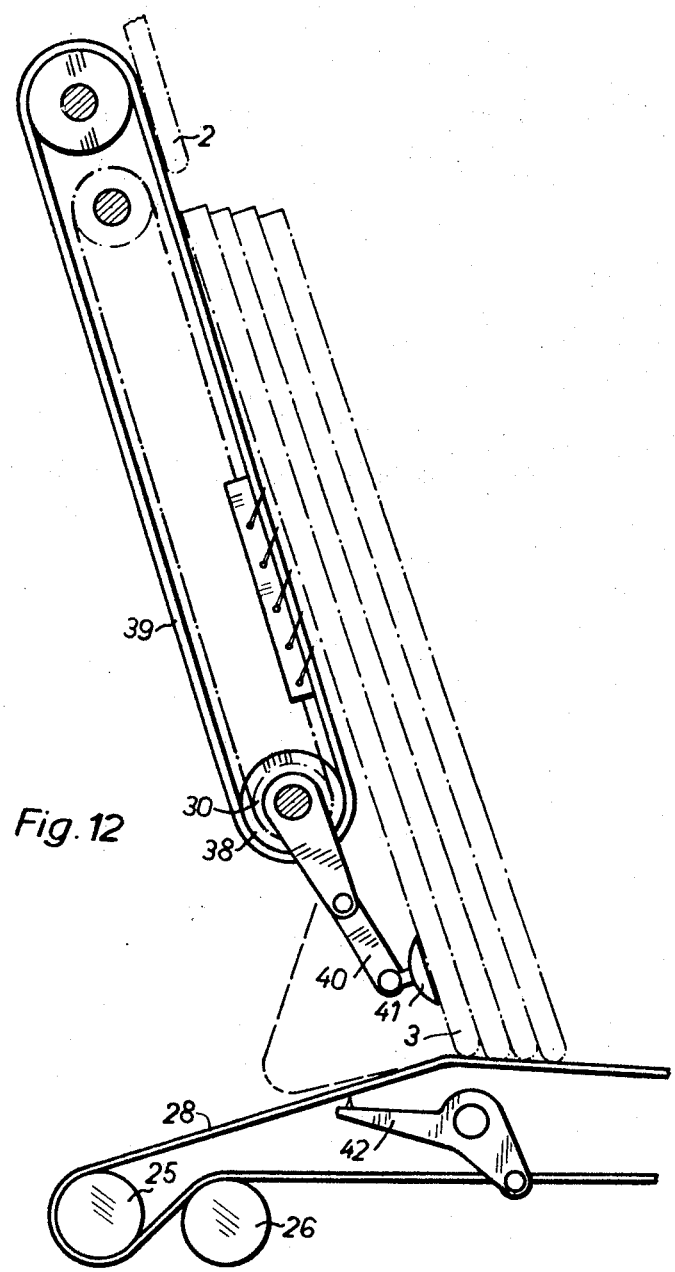

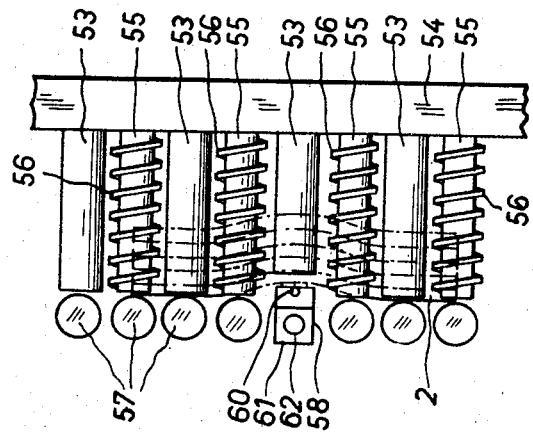
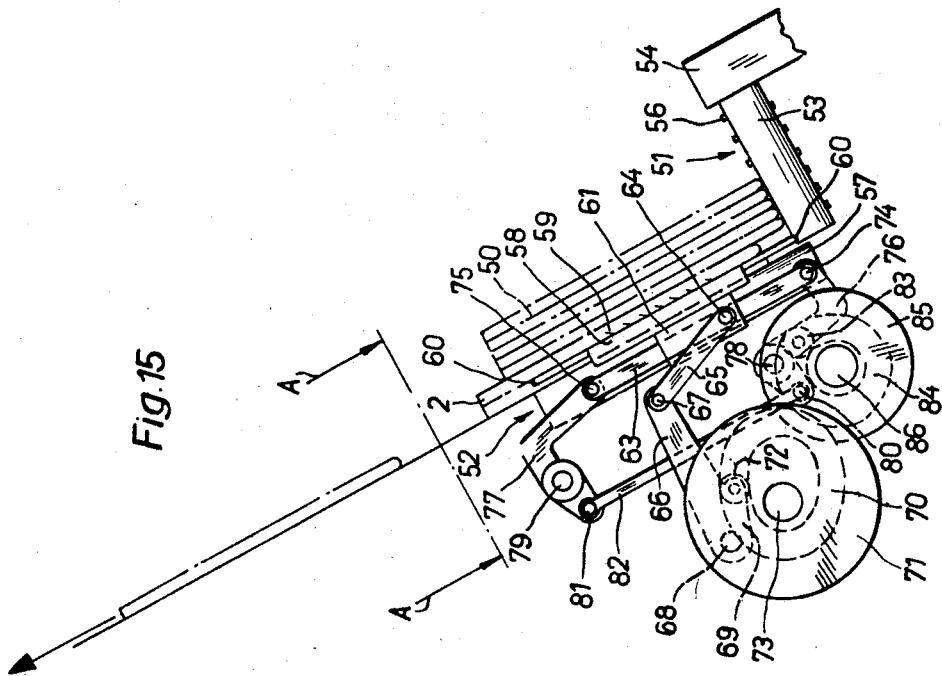

3,446,498
APPARATUS FOR SEPARATING SHEETS OR LIKE ARTICLES FROM A PILE
Walter Reist, Hinwil, Zurich, Switzerland, assignor to Ferag, Fehr & Reist A.G., Hinwil, Zurich, Switzerland
Filed May 12, 1967, Ser. No. 638,073
Claims priority, application Switzerland, May 13, 1966, 6,995/66
Int. Cl. B65h 1/02, 3/08, 3/22
U.S. Cl. 271—44     15 Claims

ABSTRACT OF THE DISCLOSURE

A device for separating sheets from a pile by holding the pile in tilted attitude while a withdrawal device reciprocates back and forth for successively removing the bottommost sheet from the pile. The withdrawal device may include pivotal sheet engaging members or may have a second back and forth movement towards and away from the pile.

---

Figure 1:
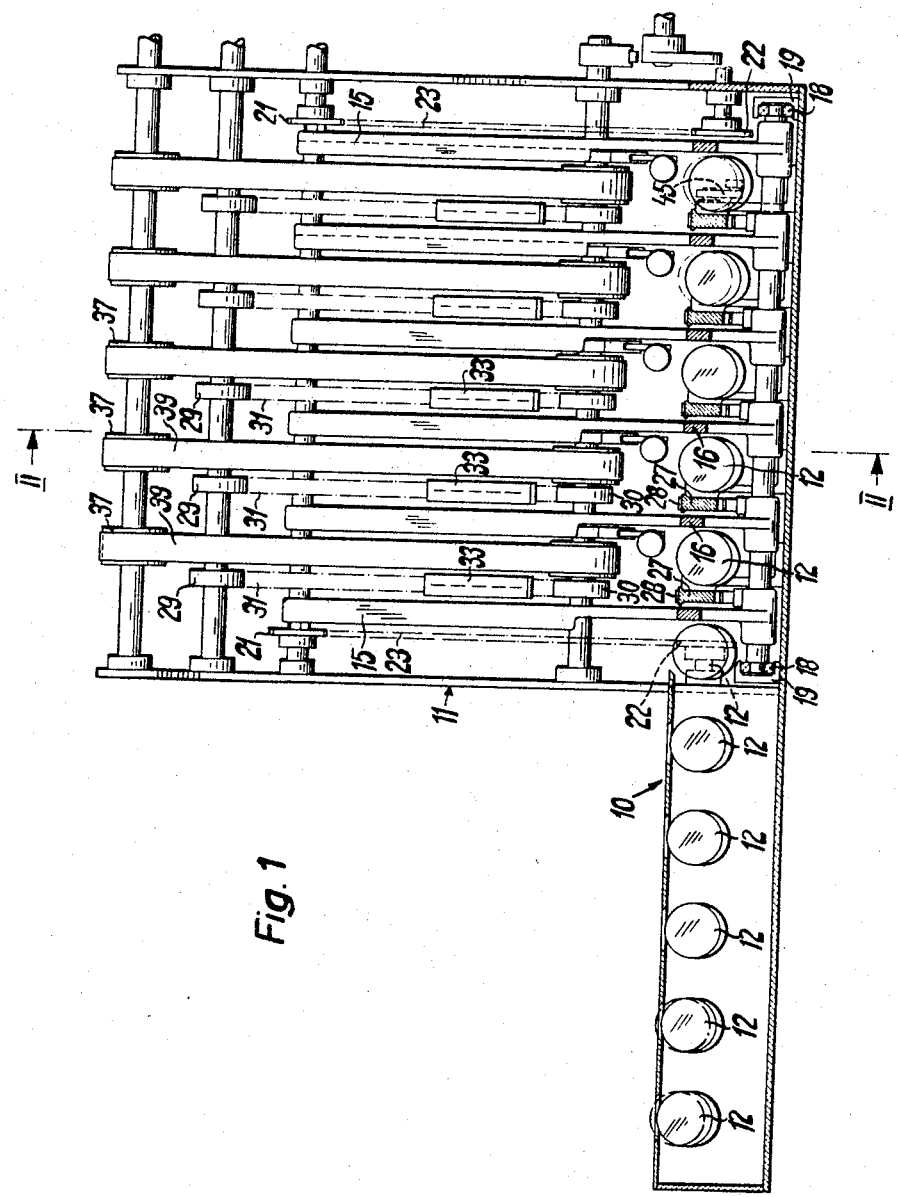

This invention relates to apparatus for separating sheets and like laminar articles from a pile of such articles by means of a reciprocating separating device which withdraws the sheets from the bottom of the pile. Preferably, the separating device is reciprocable in an inclined plane, and a tilting device is provided for the pile in order to bring the pile from its normal position in which the sheets are horizontal to an inclined position in which the lowermost sheet of the pile bears on an inclined supporting surface extending parallel to said inclined plane of the separating device.

The articles to be separated from piles by apparatus according to this invention, more particularly, are sheets, foils, plate-shaped laminar articles, and also folded sheets or foils which can be piled up to form a prismatic pile, and which are to be fed singly to processing stations for further processing.

When such articles are separated piece by piece from a pile, fed to a processing station, and after processing the articles are again deposited to form a pile, the succession of the articles in the new pile is reversed with respect to that in the original pile. Such reversal of the succession of articles, in certain circumstances, may be undesired, or even inadmissible, particularly when the articles of several piles are consecutively numbered and the sequence thereof must be conserved.

Such inconveniences could be avoided, for example by separating the sheets again from the second pile and forming a third pile in which the original succession of the sheets in the first pile would be reestablished. It would also be possible to turn the second pile as a unit about 180° in order to restore the original succession of sheets.

These two methods, however, have substantial drawbacks. The first one requires considerable time, space and equipment in order to re-establish the original succession of the piled-up articles, and the second one results in the articles being turned upside down when the pile is turned as a unit, which in most cases is not desired.

It is a object of the present invention to provide apparatus for separating articles from a pile, which avoids the mentioned drawbacks.

According to the invention, the apparatus for separating laminar articles from a pile comprises separating means adapted to move to-and-fro in a direction parallel to the plane of the articles in the pile, and means arranged to cause operative engagement of said separating means with the lowermost article of the pile during movement of the separating means in one direction of said to-and-fro motion.

Owing to the fact that the articles are separated from the bottom end of the pile, there results the additional advantage that the level, where the article to be separated is engaged, remains stationary, while in sheet separators removing the sheets from the top of a pile, this is only the case when the pile supporting surface is raised after each removal of a sheet for a distance corresponding to the thickness of a removed sheet; accordingly additional structural means are required for effecting such raising of the pile.

For this reason, apparatus according to the present invention can also advantageously be used in such cases where it is not essential to conserve a certain predetermined succession of the sheets or articles, or the same orientation of the articles after having been individually processed.

A further object of the invention is the provision of apparatus for separating sheets from a pile in which the separating means are reciprocable in an inclined plane, while a tilting device is provided for the pile in order to bring the pile from its normal horizontal position into a position in which it bears against a supporting surface extending parallel to said inclined plane of the separating means. The purpose of this arrangement is to partly relieve the lowermost article of the pile from the weight of the pile, and to reduce the friction between the lowermost and the second to last article of the pile in order to facilitate the separation of the lowermost article from the pile.

The load acting on lowermost article is the smaller the more inclined plane approaches the vertical position, this load decreasing with the cosine of the angle of inclination. The reduction of the load acting on the lowermost article is important since it is necessary to reduce the force required for withdrawing the lowermost article for avoiding any damage which may be caused to the surface of the article being withdrawn by the separating means.

Two embodiments of the invention are illustrated by way of example in the accompanying drawings in which:

FIGURE 1 is a front view of a preferred embodiment of the apparatus for separating sheets from a pile, FIGURE 2 is a section along the line II—II of FIGURE 1, FIGURE 3 represents a part of the separating or withdrawing means of the apparatus according to FIGURE 1 drawn to a larger scale, FIGURE 4 represents at a reduced scale a diagrammatic plan view of the apparatus according to FIGURE 1, FIGURES 5, 6 and 7 are diagrammatic views in elevation representing various stages of operation of the tilting device of the apparatus, FIGURES 8, 9, 10, 11 and 12 show a portion of the sheet separating or withdrawing means at different stages of operation of withdrawal of the lowermost sheet of the pile, drawn to a layer scale.

Figure 14:
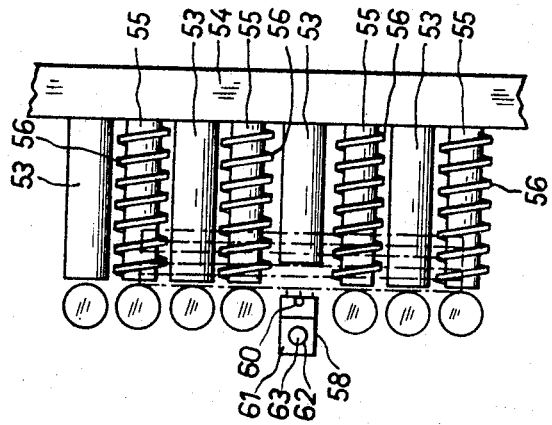
Figure 13:
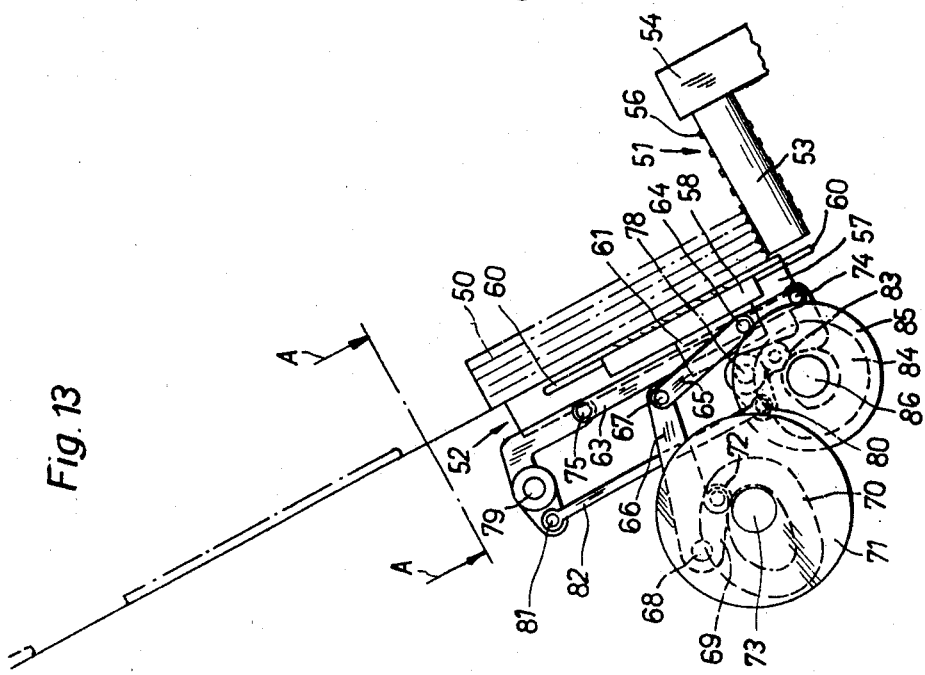

FIGURES 13 and 15 are diagrammatic side views of a modification of the apparatus to which the pile can be fed already in inclined position, shown in two different operating positions, FIGURES 14 and 16 are diagrammatic plan views of the devices of FIGURES 13 and 15, viewed in the direction of the arrows A.

Referring to FIGURES 1 and 2, the represented apparatus comprises a receiving unit 10 and a sheet withdrawing unit 11. The receiving unit is destined to feed the pile which normally is delivered in horizontal position, to the withdrawing unit. For this purpose the unit 10 comprises a roller conveyer including a plurality of rollers 12 which can be raised and lowered by means of diagrammatically represented lifting means 13, in order to depose the conveyed pile 1 (FIG. 2).

A tilting fork 14 forms a sort of connecting member between the receiving unit 10 and the withdrawing unit 11. The tilting fork 14 comprises a plurality of parallel cranked arms having a straight receiving section 15 and a straight abutting section 16, each series of sections 15 and each series of sections 16, respectively, defining a plane, the two planes including an obtuse angle between themselves.

The tilting fork is pivotally mounted and for this purpose the fork arms are rigidly connected at their apex 17 between the sections 15 and 16, and at both lateral ends the fork is guided in horizontal channels 19 by means of rollers 18 forming the tilting axis of the fork. The free ends of the receiving sections 15 of the fork are also rigidly connected with one another and the two other sections 15 each are connected at 20 to an inclined endless driving chain passing over upper and lower guide rollers 21 and 22, respectively. A reversing drive for the chain, which is not represented, is arranged for moving the chain in both directions. In FIGURE 2 it can be seen that the tilting fork 14 can pivot from a receiving position shown in dash-and-dot lines to a withdrawing position shown in full lines, in a manner which will be described later. In FIGURE 1 it can be recognized that according to the position of the tilting fork 14, either its receiving section 15 or its abutting section 16 may penetrate between the rollers 12 and extend parallel with them, so that when the rollers 12 carrying a pile are lowered relatively to the respective section of the tilting fork, the received pile is deposited on this section. A narrow endless conveyor belt 28 passing around guide rolls 24, 25 (FIG. 2) and tensioning rolls 26, and supported on slide rails 27 (FIG. 1) is arranged between each roller 12 and its adjacent section of the tilting fork. All conveyor belts 28 are continuously travelling parallel to each other, in the direction in which their upper strands move towards the withdrawal section 11 of the apparatus. The purpose of these conveyor belts will be described later.

The withdrawal means arranged in the withdrawal unit are visible from FIGURES 1 and 2. These means comprise a plurality of endless parallel driving members 31 passing over upper and lower rows of guide rollers 29 and 30, the guide rollers of each row having aligned axes and being connected to a reversing drive (not shown). The strand of the endless driving members 31 facing towards the receiving unit 10 carries a withdrawal member 33 provided with gripping elements 32 and moving to-and-fro with the endless driving members 31.

As represented in FIGURE 3, the gripping elements 32 are formed as card points which are pivotally mounted in a frame 35 and are spring loaded or biased by means (not shown) into operating position as shown in FIGURE 3, where they abut against stops 36 preventing their rotation in clockwise direction during engagement of a sheet for its withdrawal from the pile, while during return movement of the frame 35 a contact of the points with a sheet of the pile suffices to turn the points 32 in counterclockwise direction into the frame and out of sheet engaging position. It shall be particularly pointed out, that the withdrawal member as represented in FIGURE 3 is given by way of example only. The specific structure and sheet engaging means will obviously depend of the nature of the article to be withdrawn, of the required withdrawal force and of the admissible injury the surface of the article may be allowed to suffer.

If desired, the withdrawal elements can be formed as suction cups exerting a controlled suction action, or as a friction promoting coating acting only in one direction of movement or engageable with and disengageable from the lowermost article of the pile. The gripping elements can also be formed as retractable barbs or as overlapping scale-shapel blades.

Referring again to FIGURES 1 and 2, the withdrawing unit 11 of the apparatus also comprises conveyor means. These latter comprise a series of narrow, parallel conveyer belts 39 passing over axially aligned upper and lower guide rollers 37 and 38 connected to a drive (not shown), the strand of the conveyer belts facing the receiving unit 10 continuously moving upwards, preferably at the same speed as the withdrawal member 33 when its moves upwardly. In order to prevent a withdrawal of the lowermost article 2 from the pile 1 due to frictional force by the conveyer belts 39, the surface of these belts is made quite smooth, so as to leave the function of withdrawal of the lowermost article entirely to the member 33 when this latter moves upwardly.

The withdrawing unit 11 further comprises a separator formed by a suction cup 41 pivotally connected with a lever system 40 and a retaining device comprising a pivotable needle point or prick carrying member 42. The members 41 and 42 are actuated by a cam member 43 and a cam follower lever 44 (FIG. 2) as will be described later.

It is seen from the plan view in FIGURE 4 that the receiving unit 10 is of greater width than the withdrawing unit 11, for the purpose of forming a feeding path for feeding a pile 1 by means of the rollers 12. Since the rollers, as already mentioned, can be raised and lowered, the lateral extension of the receiving uint 10 can be used as a waiting station for a pile 1' to be delivered, while the remaining portion of the apparatus is still occupied with separating sheets from the preceding pile. As soon as the tilting fork 14 of the apparatus is ready to accept a further pile, this pile is fed in the direction of the arrow 5 onto the tilting fork 14 (FIG. 4).

FIGURES 5 to 7 illustrate the operation of the tilting fork during tilting of a pile into sheet separating position. The pile is delivered by the rollers 12 to a position above the sections 15 of the fork, as shown in FIGURE 5. The rollers 12 are then lowered so that the pile will be deposited onto the sections 15. Now the chain drive 23 will be actuated to control the tilting movement of the fork. As seen from FIGURE 6, the fork with its two sections 15 and 16 in an intermediate position forms an open V, the pile 1 under the influence of gravity sliding towards the apex of the V and taking an inclined position. At the end of the tilting movement of the fork (FIG. 7) the pile has been turned through an angle of about 70° and bears with its lowermost sheet against the receiving sections 15 of the fork and with the edges of the sheets resting on the abutting sections 16, the conveyor belts 28 being effective to hold the pile in this position, i.e. closely in contact with the fork sections 15 now in upright position, and preventing any sliding away of the sheets towards the right on the fork sections 16. The short sliding movement of the sheets relatively to each other during tilting of the pile advantageously initiates loosening of the adjacent sheets, thereby favouring the following withdrawal of the sheets. Now the tilting fork remains in the position of FIGURE 7 until all the sheets of the pile have been withdrawn. Only then the fork returns into its receiving position according to FIG. 5, whereafter a new pile can be delivered thereon and the tilting operation is repeated. It is obvious that the chain drive 23 controlling the tilting movement of the fork can operate in such manner that the return movement of the fork is effected at a higher speed, in order to reduce the time of inoperative periods of the apparatus.

When the inoperative periods between processing successive piles, i.e. between withdrawal of the last article from one pile and withdrawal of the first article from the successive pile is to be reduced to a minimum, the tilting fork can be arranged so that it can return into pile receiving position while a pile is still in the sheet separating position. In this case the receiving and abutting sections 15, 16 of the fork would not be rigidly connected, but a pivotal connection of the two adjacent ends of the two sections would be provided, and the chain drive would have to be modified. When the receiving sections 15 have attained their upright position according to FIGURE 7, they would be turned relatively to the sections 16 in counter-clockwise direction until they would arrive in line with the sections 16. Then the fork could be retracted into pile receiving position without the pile from which sheets are still separated forming an obstacle against retraction of the fork, and the two sections of the fork would again assume their angular position with respect to each other.

FIGURES 8 to 11 illustrate the different positions of operation of the various members taking part in the separation of a sheet from the pile, only those reference numerals required for understanding the operation being indicated in these figures. The following members, already described in relation with FIGURES 1 and 2 will be recognized. The endless driving member 33 and the gripping elements 32; the lower guide roll 30; the withdrawing conveyer belts 39 travelling in the direction of the arrow 7 with the lower guide roll 38; the suction cup 41 with its associated actuating levers 40 and retaining member 42; the conveyer belts 28 travelling in the direction of the arrow 6 with the corresponding guide rolls 25 and tensioning rolls 26.

In FIGURE 8 the pile shown in dash-and-dot lines is in the same position as in FIGURE 7. The suction cup is in contact with and ready to act on the lowermost article 2 of the pile, which articles, in the present example, will be folded newspapers. The lowermost article 2 of the pile is now separated from the pile at its bottom portion by causing the suction cup 41 to swing away from the pile into the position according to FIGURE 9, whereby a portion of the second lowest article 3 is exposed. The retaining prick 42 is now pivoted towards the exposed portion of the article 3 to engage this article and prevent it from sliding off together with the article 2 when this latter is separated. Now the suction action in the cup 41 is interrupted and the withdrawing member 33 is set in motion in the direction of the arrow 8 (FIG. 10). The gripping elements 32 penetrate into the surface of the lowermost article 2 and start to separate it from the remainder of the pile by moving it upwardly. Such upward movement is assisted by the conveyor belts 39. During the upward movement of the article 2 (FIG. 11) the suction cup 41 is applied against the second lowest article 3 which still is retained by the prick 42. In the meantime the lowermost article 2 has been separated and raised so far that its upper edge becomes exposed and can be gripped for example by gripping tongs (not shown) and completely retracted from the pile. During such removal of the article 2 the withdrawing member 33 returns to its starting position (FIG. 12) and the retaining prick 42 is released from engagement with the article 3 which now has become the lowermost article of the pile. The conveyer belts 28 feed the pile towards the left through the distance corresponding to the separated sheet to again ensure an intimate contact of the lowermost sheet with the withdrawing member 33 and the separating conveyer belts 39. Now, the described separating operation can start again until all the sheets of the pile have been separated.

While most of the driving devices in the described example are formed by endless travelling drives, it is possible to replace the endless driving members by articulated link gearing with straight motion guides.

FIGURES 13 to 16 diagrammatically show a modification, only the essential structural members being represented for the sake of clearness.

This modification may comprise a tilting device similar to the tilting fork 14 in the embodiment according to FIGURES 1 to 12, but in the following description it is supposed that the pile 50 already has been supplied to the separating means in the represented position. As shown in FIGURE 13, the apparatus comprises a receiving unit designated as a whole by 51, destined to support the pile with the articles resting on it by an edge thereof, and a withdrawing unit 52 on which the pile is resting in tilted position.

The receiving unit comprises a roller conveyer having rollers 53 mounted on a frame 54 so as to be freely rotatable. Further rotatable screw rollers 55 are mounted between the rollers 53 and are provided with a helical winding 56, the external diameter of these windings being greater than the diameter of the rollers 53 (see FIGS. 13 and 15). The rollers 55 are positively driven by driving means, not shown, located within the frame 54, the direction of rotation being such that the helical windings tend to urge the pile supported thereon towards the withdrawing unit 52.

The screw rollers thus accomplish the same result as the conveyer belts 28 in the embodiment of FIGURES 1–12, namely to apply the pile into intimate contact with the withdrawing unit and to feed the pile towards this unit after each separation of the lowermost sheet. The intermediate rollers 53 act to prevent an undesired lateral sliding away of the pile owing to rotation of the screw rollers 55, since the rollers 53 maintain the pile 50 at a sufficient spacing from the positively rotating core of the screw rollers 55.

The withdrawing unit 52 comprises a roller conveyer having rollers 57 which are mounted to be freely rotatable, in a manner not shown in detail. The rollers 57 practically form a supporting plane for the lowermost article of the pile 50.

A withdrawing device is arranged between two adjacent rollers 57, this device including a withdrawing member 58 similar to the member 33 of FIGURES 1 to 12. The member 58 also is provided with gripping needles 59. At both ends of the withdrawing member an extension pin 60 is secured the purpose of which will be described later.

The drive of the withdrawing member 58 is effected by a cam controlled crank gear. A guide block 61 having a bore 62 (FIG. 14) is secured to the member 58. A cylindrical guide rod 63 extends through the bore 62. A link 65 is pivotally connected by one of its ends at 64 to the block 61, while the other end of the link is articulated at 67 to one arm 66 of the a bellcrank lever pivotally mounted on a fixed pin 68. The other arm 69 of this lever carries a cam follower 72 engaged in a cam slot 70 provided in one face of a rotatable cam disc 71 driven at constant speed about a fixed axis 73. The cam slot 70 is of oval or egg shape and forms a closed path which is eccentric with respect to the axis 73. It results therefrom that upon rotation of the cam disc 71, the withdrawal member 58 effects a reciprocating movement parallel to the guide rod 63, this movement being similar to the corresponding movement of the member 33 of FIGURES 1–12.

The guide rod 63 itself is pivotally connected at both ends with one arm of bellcrank lever 76 and 77, respectively (FIG. 15) which are turning on fixed axes 78 and 79. The other arms of the two bellcrank levers are pivotally connected to each other by means of a connecting link 82. The lever 76 carries a cam follower roll 83 engaged in a cam slot 84 provided in a cam disc 85 turning on an axis 86 at the same speed of rotation as the cam disc 71.

The described structure acts in such manner that the guide rod 63, while remaining parallel to itself, effects a to-and-fro movement towards the pile 50 and away from the pile, since the points of articulation 74, 75, 80 and 81 form the corners of a parallelogram. It will be understood that the to-and-fro movement of the withdrawing member 58 parallel to the surface of the articles of the pile, is superposed by a two-and-fro movement at right angles thereto, moving the member 58 towards and away from the pile.

The cam disc 71 and 85, as already mentioned, are driven at the same rotary speed and are so positioned and arranged that the withdrawing member 58 during its movement in sheet separating direction substantially projects beyond the plane formed by the rollers 57 of the withdrawing unit 52, and upon effecting its return movement does no longer project beyond this plane.

The embodiment of the invention illustrated in FIGURES 13 to 16 has certain important advantages. Since the laminar articles, such as sheets or newspapers, forming the pile 50, usually are flexible, the article are slightly bent or buckled at the beginning of the withdrawing movement by the action of the withdrawing member 58 in combination with the continuous action of the screw rollers 55, as is indicated in FIGURES 16 in dash-and-dot lines. Such buckling is still favoured by the two extension rods 60 of the member 58, so that buckling appears over the entire width of the articles. The result of buckling of the articles is a stiffening of the articles during withdrawal thereof from the lower end of the pile and a safe withdrawal is enabled, while at the same time sliding of the second lowest article together with the lowermost article being withdrawn is avoided.

Owing to the withdrawing member 58 being driven like a crank up and down and to-and-fro, this member imparts a continuous vibratory motion to the pile which loosens up the pile, particularly in the region of the lowermost article, so that the additional separating means including the suction cup 41 and retaining needle 42 of the embodiment of the invention shown in FIGURES 1 to 12 is not indispensable as long as the articles to be separated have a certain stiffness as it is the case, for example, with folded newspapers.

A further advantage of the embodiment according to FIGURES 13 to 16 is that the card-like gripping needles 59 no longer need to be pivotally mounted in the frame of the withdrawing member 58.

I claim:

1. Apparatus for separating laminar articles from a pile, said apparatus comprising separating means arranged for to-and-fro movement in a direction parallel to the plane of the articles in the pile, means operating to cause engagement of said separating means with the lowermost article of the pile during movement of the separating means in one direction of said to-and-fro movement, means providing a supporting surface situated in said inclined plane, said separating means effecting to-and-fro movement in an inclined plane, tilting means for moving said pile onto said supporting surface, said tilting means including a pile receiving fork pivotally mounted for to-and-fro pivoting movement between a horizontal position and a position extending parallel with said supporting surface, said receiving fork including a trailing edge, and an abutting fork attached to said trailing edge and forming an obtuse angle with the receiving fork, said abutting fork supporting the lateral edges of the article of the pile in tilted position.

2. Apparatus according to claim 1 comprising a retaining member arranged to act on the second lowest article of the pile to prevent said second lowest article to slide along together with the lowermost article upon separation thereof.

3. Apparatus according to claim 2 comprising a separator member and in which said retaining member is associated with said separator member for separating a portion of the lowermost article from the pile and exposing the second lowest article of the pile for engagement with said retaining member.

4. Apparatus according to claim 3 comprising a pivoting lever and cam means and in which said retaining member is pivotally mounted for moving towards and away from said second lowest article of the pile, said separator member being mounted on said pivoting lever, said cam means controlling the movement of said retaining member and said pivoting lever in synchronism with the movement of said separating means.

5. Apparatus according to claim 1, in which said separating means comprises a sheet withdrawing member having a surface in contact with the lowermost article of the pile upon to-and-fro movement of said separating means, said withdrawing member including article engaging means.

6. Apparatus according to claim 5, in which said article engaging means include card-like gripping needles pointing in article withdrawing direction.

7. Apparatus according to claim 5, in which said article engaging means are suction cups, comprising means to control the suction action of the cups synchronously with the to-and-fro movement of said separating means.

8. Apparatus according to claim 5, in which said article engaging means include a friction coating adapted to frictionally engage the lowermost article in synchronism with the to-and-fro movement of the separating means.

9. Apparatus according to claim 1 comprising a conveyer member and in which said supporting surface is defined at least in part by said conveyer member, said conveyer member being arranged for movement in the direction of withdrawal of the articles from the pile, the force exerted by said conveyer member on the lowermost article being smaller than the force required to withdraw said article from the pile.

10. Apparatus according to claim 1 comprising conveyer means acting on the lateral edges of the article of the pile in tilted position to feed the pile towards said supporting surface after withdrawal of an article from the bottom of the pile.

11. Apparatus according to claim 10, in which said conveyer means include screw conveyers acting to feed the pile towards the supporting surface.

12. Apparatus according to claim 11 comprising supporting rollers extending parallel to and arranged between the screw conveyers.

13. Apparatus according to claim 11 comprising means by which said screw conveyers are continuously driven and operate to cause buckling of the articles in the direction of withdrawal thereof, at least in the bottom region of the pile.

14. Apparatus according to claim 1, in which said separating means, in addition to said to-and-fro movement in a direction parallel to the plane of the articles in the pile are movable in a direction at right angles to said to-and-fro movement towards and away from the pile, comprising means for moving the separating means towards the pile at the beginning of the article withdrawing movement, and for moving the separating means away from the pile at the beginning of the return movement of the separating means.

15. Apparatus according to claim 14 comprising a movable guide rod and cam means and in which the separating means are slidably mounted on said movable guide rod, said cam means controlling the movement of the guide rod towards and away from the pile.

References Cited

UNITED STATES PATENTS

| 1,530,209 | 3/1925 | Scheuner | 271—43 |
| 3,130,967 | 4/1964 | Brell | 271—62 |
| 3,240,489 | 3/1966 | Pinckney | 271—62 |

FOREIGN PATENTS

| 479,901 | 1/1952 | Canada. |
| 624,864 | 8/1961 | Canada. |

RICHARD E. AEGERTER, Primary Examiner.

U.S. Cl. X.R.

271—62